(12) United States Patent  
Smith

(10) Patent No.: US 8,068,808 B2  
(45) Date of Patent: Nov. 29, 2011

(54) METHOD AND SYSTEM FOR PROVIDING A DEPLOYABLE EMERGENCY CALL SERVICE FOR WIRELESS HANDSETS

(75) Inventor: Clint Smith, Warwick, NY (US)

(73) Assignee: Rivada Networks LLC, Centreville, VA (US)

( * ) Notice: Subject to any disclaimer, the term of this patent is extended or adjusted under 35 U.S.C. 154(b) by 424 days.

(21) Appl. No.: 12/421,979

(22) Filed: Apr. 10, 2009

(65) Prior Publication Data

US 2009/0264094 A1   Oct. 22, 2009

Related U.S. Application Data

(60) Provisional application No. 61/045,588, filed on Apr. 16, 2008.

(51) Int. Cl.  
*H04M 11/04* (2006.01)

(52) U.S. Cl. ............... 455/404.2; 455/404.1; 455/432.1; 455/434; 379/32.01; 379/32.05

(58) Field of Classification Search .................. 455/403, 455/404.1, 404.2, 415, 432.1, 432.3, 434, 455/466, 521; 379/32.01, 32.05, 33, 37, 379/38, 45, 46  
See application file for complete search history.

(56) References Cited

U.S. PATENT DOCUMENTS

| | | | |
|---|---|---|---|
| 7,292,848 B2 * | 11/2007 | Mazzara et al. | 455/419 |
| 7,398,082 B2 * | 7/2008 | Schwinke et al. | 455/419 |
| 7,835,741 B2 * | 11/2010 | Lee et al. | 455/435.2 |
| 7,904,060 B2 * | 3/2011 | Krause | 455/414.1 |
| 2004/0203692 A1 * | 10/2004 | Schwinke et al. | 455/419 |
| 2007/0054664 A1 * | 3/2007 | Kim | 455/432.1 |
| 2008/0305789 A1 * | 12/2008 | George et al. | 455/432.1 |
| 2009/0093232 A1 * | 4/2009 | Gupta et al. | 455/410 |
| 2010/0075669 A1 * | 3/2010 | Sparks et al. | 455/433 |

* cited by examiner

*Primary Examiner* — Cong Tran  
(74) *Attorney, Agent, or Firm* — The Marbury Law Group PLLC

(57) ABSTRACT

Embodiments of systems and methods are presented to provide local citizenry with the ability to initiate emergency calls on their mobile device through a deployable cellular communication resource, such as a switch on wheels. The mobile device may be provisioned with a primary preferred roaming list (PRL) and a secondary PRL. The secondary PRL is accessed only when a switch-to-secondary-PRL flag is set in the primary PRL. Upon detection of the switch-to-secondary-PRL flag, the mobile device may enter an emergency call mode which only allows the mobile device to initiate an emergency call. If no network listed in the primary PRL and no emergency network listed in the secondary PRL is available, the mobile device may pause for a predetermined time before repeating attempts to access a network in order to conserver battery power until cellular communication networks are repaired or temporary networks implemented.

23 Claims, 9 Drawing Sheets

151

| SID | Selection Preference | Roaming Indicator | Acquisition Index |
|---|---|---|---|
| Home System (SID) | First | Off | 0 |
| Roaming Partner 1 (SID) | Second | Off | 1 |
| Roaming Partner 2 (SID) | Third | Off | 2 |
| Roaming Partner 3 (SID) | Fourth | On | 3 |

152

PRL

| Acquisition Index | Acquisition Type | Blocks/Channel |
|---|---|---|
| 0 | PCS CDMA Blocks | B |
| 1 | PCS CDMA Blocks | A |
| 2 | PCS CDMA Channels | 283 699 384 777 |
| 3 | Cellular Analog | On |

Primary PRL

| SID | Selection Preference | Roaming Indicator | Acquisition Index | Secondary PRL Flag |
|---|---|---|---|---|
| Home System (SID) | First | Off | 0 | No |
| Roaming Partner 1 (SID) | Second | Off | 1 | No |
| Roaming Partner 2 (SID) | Third | Off | 2 | No |
| Roaming Partner 3 (SID) | Fourth | On | 3 | Yes |

162

| Acquisition Index | Acquisition Type | Blocks/Channel |
|---|---|---|
| 0 | PCS CDMA Blocks | B |
| 1 | PCS CDMA Blocks | A |
| 2 | PCS CDMA Channels | 283 699 384 777 |
| 3 | Cellular Analog | On |

163

Secondary PRL

| SID | Selection Preference | Roaming Indicator | Acquisition Index |
|---|---|---|---|
| Switch on Wheels (SID) | First | SOS | 4 |

164

| Acquisition Index | Acquisition Type | Blocks/Channel |
|---|---|---|
| 4 | PCS CDMA Blocks | B |

Fig. 3

METHOD AND SYSTEM FOR PROVIDING A DEPLOYABLE EMERGENCY CALL SERVICE FOR WIRELESS HANDSETS

RELATED APPLICATIONS

This application claims the benefit of priority to U.S. Provisional Patent Application No. 61/045,588 entitled "Method and System for Providing a Deployable Emergency Call Service for Wireless Handsets" filed Apr. 16, 2008, the entire contents of which are hereby incorporated by reference.

FIELD OF THE INVENTION

The present invention relates generally to a wireless mobile communication system, and more particularly to methods and systems which provides wireless mobile devices access to a deployable emergency call service.

BACKGROUND

Emergency services such as police and fire rescue often rely upon the local citizenry to alert emergency services of emergency situations. In order to do so, nearly every community in the United States has implemented an emergency call service, such as the well known 911 service. To be effective, an emergency call service needs to accomplish three goals. First, the emergency call service should recognize when someone dials the emergency number on any phone (even a pay phone when no coins have been supplied). Second, the emergency call service should route the call to the nearest available Public Safety Answering Point (PSAP) based on the call's originating location. Third, the emergency call service should notify the appropriate emergency response agency as quickly as possible so it can respond to the emergency.

While citizens reporting emergency situations could telephone a police or fire station directly through its individual local telephone number, it is more effective to provide citizens with a universal, short, easy to remember number that can be quickly dialed and directly connects to the nearest PSAP automatically. Most emergency call services in the U.S. and Canada utilize 911 as the short three digit emergency telephone number that automatically reaches a PSAP. As of 2006, 99 percent of the U.S. population had access to 911 services. Other countries have implemented the same or similar emergency call services for their citizenry. For example, the European Union has established 112 as the universal emergency number for all its member states. In most E.U. countries, 112 is already implemented and can be called toll-free from any telephone or any cellular telephone. For purposes of simplicity, emergency call service will be referred to herein as a 911 system.

Typically, there is no national 911 system. Rather, the answering points and corresponding dispatch services are locally established and maintained. In many locations in the U.S., for example, the 911 service is a joint effort between local governments and all phone companies active in the area. The cost of a 911 system is paid through local taxes and through a surcharge on the local citizenry's phone bill. Typically, the PSAP and corresponding emergency services are set up and maintained locally, usually by county, often in a joint effort between local government and any phone company active in the area. Once an emergency call is connected to the local PSAP, the appropriate local emergency services may be dispatched for fast response.

Within the conventional Public Switched Telephone Network (PSTN) system, emergency 911 calls are made through standard land line telephones operating on the PSTN. Because telephones in a conventional PSTN are stationary, various capabilities of a basic 911 system may be easily enabled. For example, Automatic Number Identification (ANI) may be implemented. As its name suggests, ANI automatically identifies the telephone number of the calling party. Coupled with Automatic Location Identification (ALI), the 911 system can automatically identify both the source and location of the calling telephone station. In this way, the location of the emergency situation may be determined without any verbal communication from the party making the 911 call. This is beneficial because in many times in emergency situations, callers are panicked or hurt and cannot verbally communicate the location or nature of the emergency. In addition, by automatically knowing the caller's location information, the 911 system may route the call to the nearest PSAP so as to dispatch the closest emergency response services to achieve the fastest response.

In addition, many phone companies and public safety agencies have collaborated to create Master Street Address Guides (MSAG) which are master maps that can match phone numbers, addresses and cross streets to their corresponding PSAP. When an emergency call is made, the 911 system network hub may use the MSAG to provide emergency response services with the fastest route to respond to the caller's location.

FIG. 1A illustrates the handling of a basic conventional 911 call. In a basic conventional 911 system, a caller 101 dials 9-1-1 (or the assigned emergency number). The PSTN switch automatically recognizes the 911 number and routes the call to a dedicated 9-1-1 switch 102 that sends the call to the designated PSAP 103 for the PSTN switch that first received the call.

The PSAP call-taker (also called an operator or dispatcher) asks what the emergency is, what the location is and for a call-back phone number. Depending on the emergency, the call-taker uses radio dispatch to alert police, fire and/or EMS to go to the scene.

FIG. 1B illustrates the handling of an enhanced conventional 911 call. In the enhanced 911 system, a caller 101 dials 911 (or the assigned emergency number). The PSTN switch recognizes the 911 number dialed and accesses the ANI to get the number of the station initiating the call and routes the call to the dedicated 9-1-1 switch 102 that acts as a hub for the local network. The network uses the telephone number of the initiating telephone station to get the address from the ALI and uses the address to determine the proper PSAP 103 destination from the MSAG 104 (this is sometimes called selective routing, because the switch uses dynamic data to determine where to send the 911 call instead of blindly routing it to a pre-determined PSAP). In most cases, this all takes a little over one second. The 911 call now carries the initiating call station phone number and address along with the caller's 101 voice data to the nearest available PSAP 103. This information is displayed on the call-taker's computer when he or she takes the 911 call.

Some PSAPs 103 simultaneously send the ANI/ALI data to the police computer dispatch network to allow for immediate access. If necessary, many PSAPs can transfer the call and its accompanying data to another PSAP.

While the 911 system is extremely effective when calls are initiated on conventional PSTN telephones, mobile device (e.g., cellular telephones) and Voice over Internet Protocol (VoIP) calls have posed new problems to 911 systems. For one, mobile devices and VoIP calls do not provide location information to the system. Thus, 911 calls may not be routed to the nearest PSAP. As of 2006, more than 8 million people in the United States use a mobile device as their primary phone. Public-safety agencies report that wireless calls make up anywhere from 30 to 50 percent of emergency service calls. To accommodate this transformation in the telephone usage, changes have been implemented in most 911 systems.

Until recently, when someone called emergency services from a mobile device, no information appeared on the call-taker's screen, even in enhanced emergency call service systems. Without this information, the emergency call wasn't always routed to the PSAP closest to the caller's location. Consequently, the emergency call could end up at any PSAP in the remote vicinity, depending on how the individual wireless provider servicing the particular mobile device had set up emergency call routing.

To address this problem, Congress has mandated that cellular service providers configure their systems and the mobile devices that they support so that the location of a caller can be determined when a 911 call is placed. Local 9-1-1 systems have been implementing changes to 9-1-1 to allow for greater wireless compatibility, and upgrades are still happening now. A number of methods are used to locate 911 callers. Many new mobile devices include a Global Positioning System (GPS) receiver within the mobile device's circuitry. Such mobile devices can provide location information to the cellular telephone system over a data link. Cellular systems can also determine the general location of a 911 caller by triangulating the distance from multiple cell towers to the caller's mobile device.

To implement Congress's mandate, the Federal Communications Commission (FCC) has defined cellular telephone system upgrades to be accomplished in two phases.

Phase I provides the call-taker with the ability to see the mobile device-phone number of the 9-1-1 caller and the location of the cell-tower antenna with which the mobile device is connected. This phase also requires that the call be routed to the PSAP nearest to that tower. As of 2006, 83.6 percent of PSAPs have met all or part of Phase I requirements. Using the cell-tower location, Phase I technology can only locate a mobile device within a 3-6 mile radius.

Phase II provides the call-taker with the ability to see the mobile device phone number and the location of caller to an accuracy of 50 to 300 meters depending on the type of location system being used by the wireless provider. This phase also requires that the call be routed to the PSAP nearest to that location or nearest to the cell antenna in use, depending on the particulars of the system. As of 2006, 65.2 percent of PSAPs have met all or part of Phase II requirements.

There is no standardized method for implementing Phase II requirements, so wireless providers, in conjunction with local public-safety agencies, are using various technologies for providing mobile device location information to PSAPs. There are two basic approaches: handset-based and network-based.

FIG. 1C illustrates how a 911 call from a mobile device is connected to a PSAP. In a handset based embodiment, a GPS receiver built into the mobile device is utilized. When a caller 101 initiates a 911 call from a mobile device with a GPS receiver built in, the GPS receiver locates itself using satellites 110 orbiting overhead. The GPS receiver in the mobile device receives radio signals emitted by at least three satellites 110, measuring the time it took the signals to reach the receiver. Using trilateration, the GPS receiver can determines its location coordinates. The location coordinate information accompanies the voice and phone data transmitted to the base station. The base station and MTSO 111 either forwards the call to the dedicated 9-1-1 switch 102 (the same ones used by landline calls) for PSAP routing or routes the call to the nearest PSAP, depending on the routing path the wireless carrier chooses. At the PSAP 103, mapping equipment (typically the CAD equipment discussed in the previous system) converts the caller's coordinates to a street address that the call-taker can understand and provide to dispatched emergency personnel.

A network-based embodiment is different from the handset-based embodiment only in how the mobile device generates its latitude and longitude coordinates. As shown in FIG. 1D, a common implementation of network-based location-finding involves putting additional radio equipment on network base stations so that, in essence, they act something like a GPS receiver for signals received from the mobile device. When a caller dials 9-1-1 on the mobile device, the mobile device sends out radio signals to at least three of cell towers 113, and receivers in each tower times how long it takes for the signal to reach the tower. Using trilateration, the network can then estimate the location of the mobile device to within an accuracy of 100 to 300 meters. Once the network has estimated the latitude and longitude coordinates of the phone, this information is included with the voice call transmitted to the network switching station 111 via the base station 112 from which it is connected.

While local citizens using their mobile devices may now access conventional emergency call service systems, large scale emergencies sometimes destroy or render inoperable conventional emergency call service systems. For example, large scale emergencies such as natural disasters (e.g., earthquakes, floods and hurricanes) and terrorist attacks can disable some or all PSTN telephone and cellular telephone infrastructure. In such instances, citizens using either wired or wireless communication devices do not have any access to emergency call services. Cut off from 911 service, citizens are no longer able to aid first responders by reporting developments on their cell phones.

SUMMARY

Various embodiment systems and methods provide wireless emergency call service to local civilian (i.e., non-emergency personnel) citizens via a deployable mobile "switch on wheels." In emergency situations where conventional wireless telecommunications infrastructure is damaged or inoperable, a mobile switch on wheels may be deployed to the affected area to provide emergency personnel with wireless telecommunications capabilities. In order to conserve the limited communications resource capacity of the mobile switch on wheels, only emergency personnel mobile devices are programmed with the appropriate system identification number (SID) needed to access those mobile devices to conduct wireless telecommunication calls. The various embodiment systems and methods add wireless emergency call service for the local citizenry by providing the SID of the mobile switch on wheels to civilian mobile devices in a secondary preferred roaming list (PRL) which only allows emergency service calls. The civilian mobile devices may be programmed to search for SIDs in a secondary PRL after the primary PRL has been exhausted. Alternative embodiments allow civilian mobile devices to search for SIDs in the secondary PRL immediately in order to conserve battery power.

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention.

FIG. 2 illustrates the system table and acquisition table of a prior art preferred roaming list (PRL).

FIG. 3 illustrates exemplary primary and secondary PRL system and acquisition tables.

DETAILED DESCRIPTION

Figure 1A:
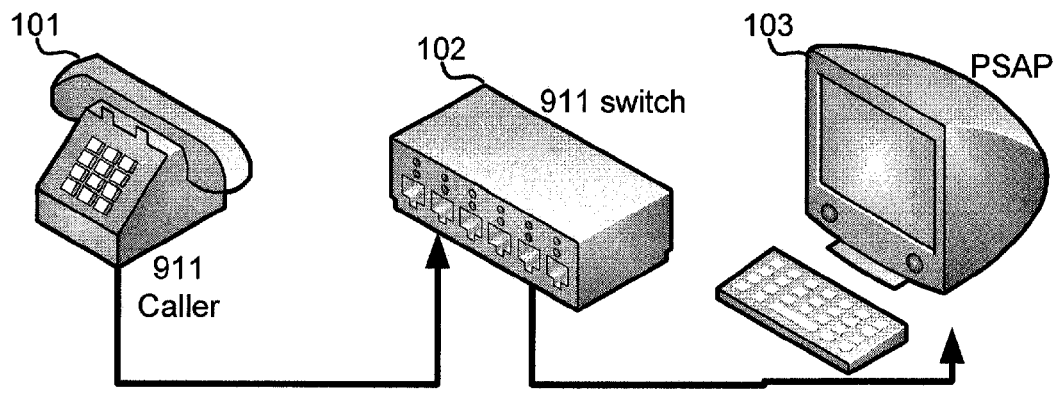
FIG. 1A illustrates a prior art basic landline emergency call system.
Figure 1B:
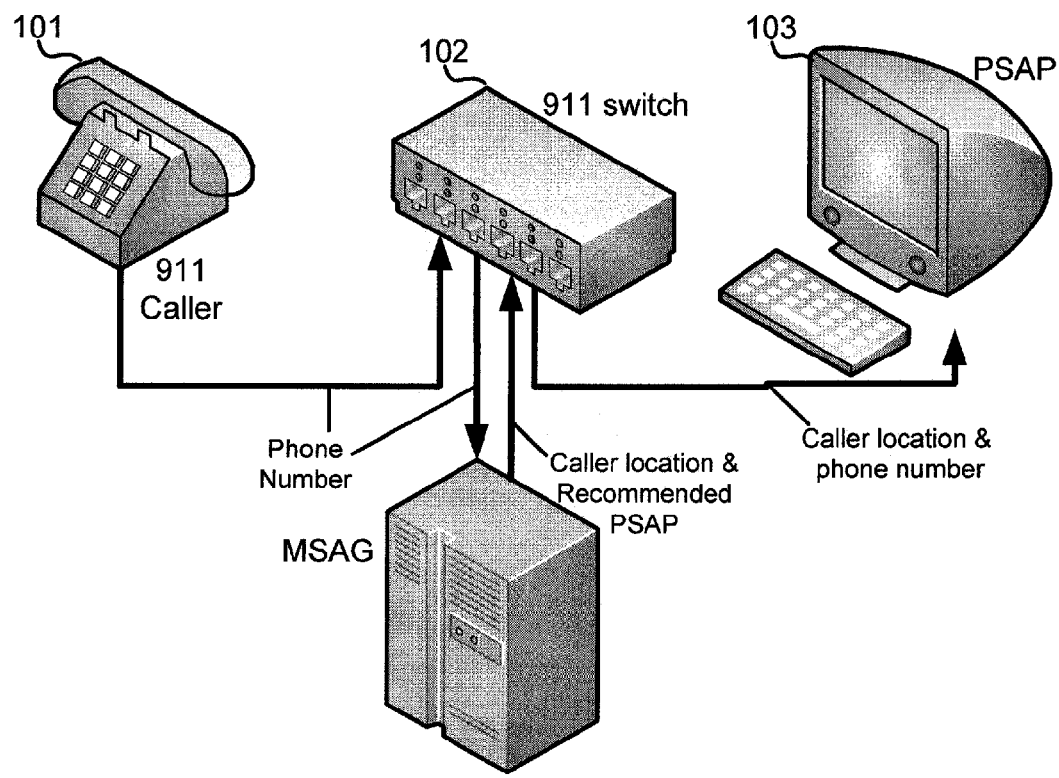
FIG. 1B illustrates an enhanced landline emergency call system.
Figure 1C:
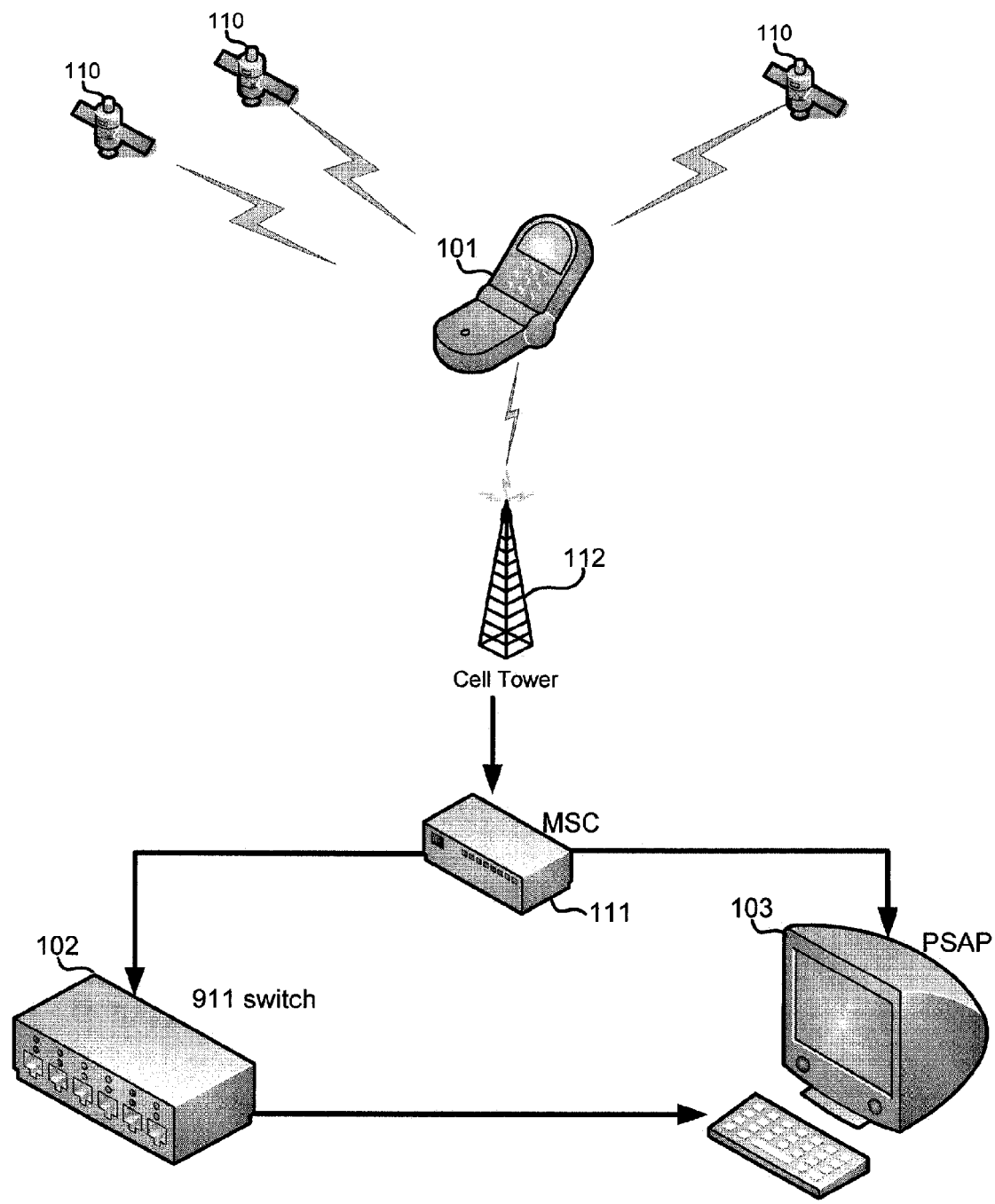
FIGS. 1C and 1D illustrate enhanced emergency call systems which accept calls from wireless mobile devices.
Figure 1D:
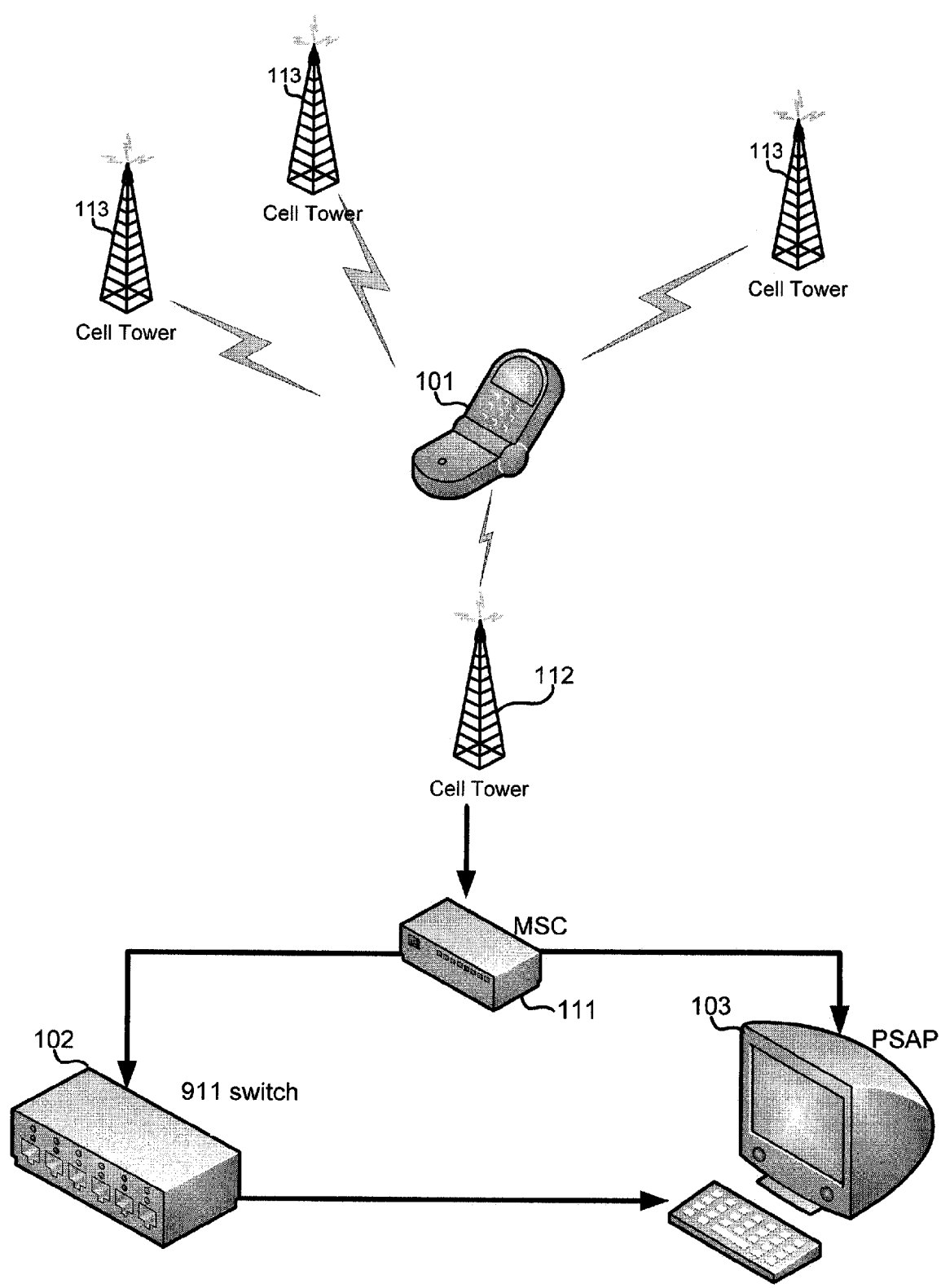

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, the terms "cellular telephone," "cell phone" and "mobile device" are used interchangeably and refer to any one of various cellular telephones, personal data assistants (PDA's), palm-top computers, laptop computers with wireless modems, wireless electronic mail receivers (e.g., the Blackberry® and Treo® devices), multimedia Internet enabled cellular telephones (e.g., the iPhone®), and similar personal electronic devices. A mobile device may include a programmable processor and memory as described in more detail below with reference to FIG. 6. In a preferred embodiment, the mobile device is a cellular handheld device (e.g., a cellphone), which can communicate via a cellular telephone network.

Ironically, one of the biggest problems of the 911 emergency call system is its vulnerability to large scale emergency situations in which the 911 emergency call system would be needed most. In response to a disaster situation, one of the highest priorities is to enable communications. Without effective communications emergency resources cannot be effectively mobilized. In many disaster situations, conventional communication infrastructure may be destroyed, damaged or rendered inoperable. When an emergency situation destroys or renders inoperable PSTN equipment and cellular towers, all forms of communications, including emergency call services, may be impossible.

To provide emergency response teams and personnel with the ability to communicate in such situations, deployable cellular communication antennas have been developed. Such deployable units, referred to herein as a "switch on wheels," can include any wireless base station such as CDMA2000/EVDO, WCDMA, LTE, IS-136, GSM, WiMax, WiFi, AMPS, DECT, TD-SCDMA, or TD-CDMA and switch, Land Mobile Radio (LMR) interoperability equipment, a satellite Fixed Service Satellite (FSS) for remote interconnection to the Internet and PSTN, and, optionally, a source or remote electrical power such as a gasoline or diesel powered generator. A more complete description of an example deployable switch on wheels is provided in U.S. patent application Ser. No. 12/249,143, filed Oct. 10, 2008, which claims the benefit of priority to U.S. Provisional Application No. 60/979,645 filed Oct. 11, 2007, the entire contents of which are hereby incorporated by reference in their entirety.

A deployable switch on wheels provides first responders with a portal to the conventional communications infrastructure outside the emergency location that remains unaffected by the emergency. Much like a mobile cellular antenna tower, the switch on wheels provides first responders with the ability to utilize their conventional cellular telephones even when the conventional stationary cellular tower antennas have been destroyed. The deployable switch on wheels includes a mobile cellular antenna that can be deployed to act as a temporary cellular tower antenna. The deployable switch on wheels may have a broadcast range approximating that of a conventional cellular tower antenna. The switch on wheels sends and receives communication signals from a plurality of mobile devices and serves as a gateway portal to the rest of the conventional communications infrastructure. When a communication signal is received by the switch on wheels from one of the plurality of mobile devices, the communication signal may be broken down into packets for transport as a voice-over-Internet-protocol (VoIP) communication. The VoIP communication signal can be transmitted via a satellite owned by a satellite service provider to a ground station far from the emergency where the communication can be forwarded through the Internet to the intended call recipient's telephone number. When a call is made to one of the plurality of mobile devices utilizing the switch on wheels as its local base station, the call is routed to the satellite service provider's router from which the call is sent via satellite relay to the switch on wheels where the call is ultimately forwarded to the intended mobile device.

Depending on the magnitude of the disaster situation, multiple switch on wheels may be deployed to the disaster area. Deploying multiple switch on wheels within a region creates an ad hoc wireless communication network which provides first responders with adequate network coverage to effectively utilize their cellular telephones until the cellular telephone infrastructure can be returned to service. In long term disaster situations, such as may occur when a coastal region is affected by a major hurricane, the switch on wheels network may remain in place for an extended period of time until conventional communications infrastructure can be repaired or replaced.

While a switch on wheels provides considerable communication infrastructure to first responders whose cell phones have been programmed to communicate with the switch on wheels, it would be advantageous to enable local citizens to access the switch on wheels for emergency 911-type calls. This capability would allow citizens to report ongoing and developing emergency situations occurring within the disaster area. By enabling the local citizenry to assist in this manner, fewer first responder personnel are needed to patrol for new or developing emergency situations, enabling those first responders on scene to focus on the emergency at hand.

Special provisions must be taken to provide civilian citizens with access to an ad hoc network established by the switch on wheels. Some types of cellular phones, such as those using GSM technology, will recognize an unknown GSM network (switch on wheels network) at least for the purposes of minimal communication, such as placing 911 calls. If the switch on wheels is maintaining a GSM network, civilian GSM phones will be able to connect to it for purposes of dialing 911. However, cellular phones using the CDMA technology will not recognize an unknown network, such as an ad hoc network provided by the switch on wheels. Unless this limitation is addressed, citizens owning CDMA cell phones may not be able to place 911 calls via an ad hoc network provided by the switch on wheels.

On the other hand, granting civilians unfettered access to the switch on wheels could overburden the limited capacity of the switch with non-essential calls, potentially blocking access by first responders. Due to the limited number of switches on wheels that may be deployed in an affected area and their limited capacity, bandwidth for communication channels is limited in an ad hoc network. Such bandwidth must be reserved for communications among first responders and emergency service personnel for command and control purposes. Thus, access by the general public must be limited to emergency 911-type calls. In other words, civilian communications must be limited to emergency 911-type calls only, and perhaps in some instances, the receipt of calls from authorized emergency personnel.

Beyond the problems of providing access and managing bandwidth capacity, there is the challenge of routing 911 calls to the appropriate PSAP. In a typical deployment, the switch on wheels routes calls destined for recipients beyond its communication radius via satellite to a ground station that may be a thousand miles or more away. Thus, 911 calls need to be routed back through whatever communication network remains to a 911 call center supporting the location of the caller. Since the deployable switch on wheels is, by its very nature, mobile and not associated with a permanent location, there needs to be a way of routing a 911 call to the appropriate PSAP that will be able to assist the caller. Also, a natural or manmade disaster that requires deployment of a switch on wheels may also destroy or render inoperable the nearest PSAP, so there may be a need to route 911 calls to a backup or temporary PSAP.

Conventional cellular telephones and other mobile communication devices are assigned special codes that are used in establishing and routing calls. These codes are used to identify the individual phone, the phone's owner (or at least the owner's service contract number) and the contracted service provider. These codes include:

(a) an Electronic Serial Number (ESN), which is a unique 32-bit number programmed into the mobile device when it is manufactured;

(b) a Mobile Identification Number (MIN), which is a 10-digit number derived from the unique phone number assigned to the mobile device;

(c) a System Identification Code (SID), which is a unique 5-digit number that is assigned to each wireless service provider by the FCC; and (d) a Preferred Roaming List (PRL) for CDMA-type mobile devices/Public Land Mobile Network (PLMN) for GSM-type mobile devices, which are prioritized listings of approved SID's that the wireless provider provides to the mobile devices in order enable mobile devices to determine network SIDs that the mobile device is allowed to utilize for service.

While the ESN is considered a permanent part of the mobile device, the MIN, SID and PRL/PLMN are programmed into the mobile device when a wireless service plan is purchased and the mobile device is activated. The purchased wireless service plan is provided by a particular wireless service provider which is referred to as the "home system." The programming of these codes is typically done by the selected wireless service provider in a process that is sometimes referred to as "provisioning."

As part of the provisioning process, CDMA-type mobile devices are programmed with a PRL, while GSM-type mobile devices are provisioned with a PLMN which operates similar to the PRL. For simplicity, the embodiments are described using CDMA terminology. One of skill in the art would appreciate that similar embodiment systems and methods may be implemented with GSM-type mobile devices by modifying the PLMN in the same manner as the PRL modifications described below. The Telecommunications Industry Association/Electronics Industry Association Interim Standard 683A (TIA/EIA/IS-683A), which is hereby incorporated herein by reference in its entirety, provides for a Preferred Roaming List (PRL) for Code Division Multiple Access (CDMA) mobile communications systems such as cellular telephones.

A mobile device's system acquisition function uses information contained in the PRL to determine the order in which listed analog frequencies or channels will be tried when the mobile device must acquire a wireless network system (also referred to as a network or communication network). A mobile device will attempt to acquire network access (i.e., locate a channel or frequency with which it can access a wireless network) at initial power-on or when a current channel or frequency is lost for a variety of possible reasons.

When the user of a mobile device travels beyond the geographic of the user's service provider network, the mobile device must locate a another communication network that will provide it with wireless services. The mobile device's PRL lists communication networks that the mobile device is authorized to access. Associated with each communication network in the PRL is a system ID (SID), as well as corresponding acquisition parameters (frequency band, channel, etc.) for each communication network. The PRL is created, loaded and updated by the user's service provider.

The PRL is maintained in such a manner that the mobile device can readily determine which communication networks cover common geographical regions. The references to common geographic regions refers to areas of common radio coverage. Moreover, the communication networks that cover a common geographical region are prioritized, i.e., ranked from most desirable to least desirable. The mobile device is programmed to attempt to acquire service starting with the highest priority communication network in the mobile device's current geographical area. There is no point in trying to acquire service on a communication network outside of the mobile device's current geographic region, since communication networks typically provide service only within a limited geographic region.

Many wireless service providers recommend that users regularly update the PRL on their mobile devices if they use their phones outside the home system frequently, particularly if they do so in multiple different areas. Updating the PRL allows the mobile device to choose the best roaming carriers, particularly "roaming partners" with whom the user's service provider has cost-saving roaming agreements, rather than use non-affiliated carriers. PRL files can also be used to identify the home network system along with roaming partners, thus making the PRL an actual list of the total coverage available to the user, including both home and roaming coverage.

The PRL is maintained by the wireless service provider operator and is normally not accessible to the user. Many wireless service providers allow users to download the latest PRL to their device by dialing an Over-The-Air (OTA) feature code, such as *228. Alternatively, the latest PRL may be downloaded into the mobile device via a hardwire connection.

The PRL consists of two tables (along with some header and overhead information). The two tables include a System Table and an Acquisition Table. The System Table is a prioritized list of communication networks that the mobile device is permitted to access (home system and roaming networks). Each communication network entry in the system table belongs to a geographic area known as a GEO. These GEOs are listed in priority order. Thus, as a mobile device enters different GEOs, the priority order in which roaming networks are to be searched may alter. Each entry also provides an acquisition table index where the frequencies associated with that particular communication network are identified and a roaming indicator that dictates the type of indication (e.g., "roaming") which should be displayed to the user when they are receiving service from that network. The Acquisition Table is an indexed list of frequencies on which the mobile device may search for particular networks. The idea behind the acquisition table is to optimize the acquisition time by identifying only the frequencies that should be searched, rather than forcing the mobile device to search the entire frequency spectrum.

FIG. 2 illustrates an exemplary prior art system table and acquisition table for a PRL for a particular geographic region. The Acquisition Table 152 in FIG. 2 contains records that list communication channels or frequencies in a priority contact order from top to bottom. For the Acquisition Table shown, for example, a mobile device would contact PCS CDMA Block B channels first, followed by Block A channels, and then channels 283, 699, 384, and 777. If the mobile device cannot contact these CDMA channels, the mobile unit would attempt contact with Cellular Analog System A frequencies.

The PRL's System Table 151 contains records having several fields. The "SID" field contains the System Identification number of preferred communication networks. The "selection preference" identifies the relative priority of each network in terms of connection desirability. As shown, for example, it is most desirable for the mobile device to connect with the home system SID. The "Roaming Indicator" field indicates a roaming indication display status on the mobile device as either "off" or "on" depending on which network the mobile device is connected to. Typically, if the mobile device is connected to its home system, then the roaming indicator will be off. The "Acquisition Index" field refers back to the Acquisition Table record number associated with an SID. Thus, the "Acquisition Index" field entry indicates the channel(s) or frequency(ies) associated with the particular SID. As shown, for example, the SID of the home system (Acquisition Index 0) is associated with PCS CDMA Block B channels (Acquisition Table record 0). Similarly, SID of Roaming Partner 3 (Acquisition Index 3) is associated with Cellular Analog System frequencies.

A typical mobile device processor executes a system acquisition function to contact a wireless communication network based on PRL entries. While many variations are possible, the following description applies to a conventional system acquisition procedure.

When the mobile device seeks to establish connection to the home system, the acquisition index will direct the mobile device to search for a communication channel on the PCS CDMA Block B channels. When the mobile device encounters a pilot signal from a base station on the PCS CDMA Block B channels, the system acquisition function continues to operate and receives an SID from the base station over an associated synchronization channel. The acquisition function then compares the received SID to the SIDs in the PRL system table 151. If the received SID matches the SID of the home system, then the mobile device will establish a communication connection with the home system. If the SID carried on the associated synchronization channel does not match the SID listed in the system table 151, the mobile device will behave as if it never received a signal on the scanned frequency.

If after scanning the PCS CDMA Block B channels the SID of the home system is not found, the mobile device will then attempt to establish connection with the next priority network listed in the system table 151. In the illustrated example the mobile device will seek out "Roaming Partner 1." Accordingly, the mobile device will search for a communication channel on the PCS CDMA Block A channels. When the mobile device encounters a pilot signal from a base station on the PCS CDMA Block A channels, the system acquisition function continues to operate and receives a SID from the base station over an associated synchronization channel. The acquisition function then compares the received SID to the SIDs in the PRL system table 151. If the received SID matches the SID of Roaming Partner 1, then the mobile device will establish a communication connection with Roaming Partner 1's network. If the SID carried on the associated synchronization channel does not match the SID listed in the system table of Roaming Partner 1, the mobile device will then seek out the next priority network listed in the system table 151. This process will continue until the mobile device connects to a network or the list of authorized networks in system table 151 is exhausted. If the mobile device exhausts all of the authorized networks listed in the system table 151, the mobile device concludes that no service is available and may post the "No Service" message on its display.

In order to limit access to the switch on wheels, the SID of the switch on wheels is not released to any non-authorized mobile device. Thus, the SID of the switch on wheels does not exist in the PRL of civilian CDMA mobile devices. Consequently, no unauthorized mobile device (i.e., a mobile device belonging to civilians) can establish connection to the switch on wheels. To provide civilians with emergency 911 access the switch on wheels communications resources, an embodiment modifies the provisioning of mobile devices to include a secondary PRL in addition to the primary PRL described above. The modified provisioning may occur when a mobile device is first provisioned or during subsequent provisioning updates which may be performed using wired or OTA provisioning methods.

FIG. 3 illustrates the primary and secondary PRLs of an embodiment that provides switch on wheels emergency call service access to the mobile devices of the local citizenry. In this embodiment, mobile devices may be provisioned with a primary PRL as well as a secondary PRL. The primary PRL may include a primary system table 161 and a primary acquisition table 162. The secondary PRL may include a secondary system table 163 and a secondary acquisition table 164. The primary PRL system table 161 is similar to the conventional PRL system table 151 described above with reference to FIG. 2, except that it is modified to include a column (i.e., a data field within each data record) containing a flag which for purposes of this description is entitled "Switch-to-secondary-PRL flag." The purpose of the switch-to-secondary-PRL flag is to inform the mobile device whether it should initiate the use of the secondary PRL. As the mobile device progresses through the system acquisition process described above, the mobile device may reach an entry in the system table 161 that has the switch-to-secondary-PRL flag set. In the example shown in FIG. 3, the network entry "Roaming Partner 3 has the switch-to-secondary-PRL flag set. If the mobile device has not established communication with a network by the time the mobile device encounters a data record in the primary PRL system table 161 which has the switch-to-secondary-PRL flag set (e.g., storing a value of "1"), the mobile device will initiate an emergency call service subroutine. The emergency call service subroutine places the mobile device in an emergency mode and only allows the mobile device to place emergency calls (e.g., 911 type calls). In this mode the mobile device will access the secondary PRL and scan for available emergency networks which may include the switch on wheels. Thus, in the example shown in FIG. 3, if the mobile device is unable to establish communications with any network after seeking out Roaming Partner 3, the mobile device will initiate the emergency call subroutine and seek a communication network from the networks listed in the secondary system table 163 of the secondary PRL.

Figure 4:
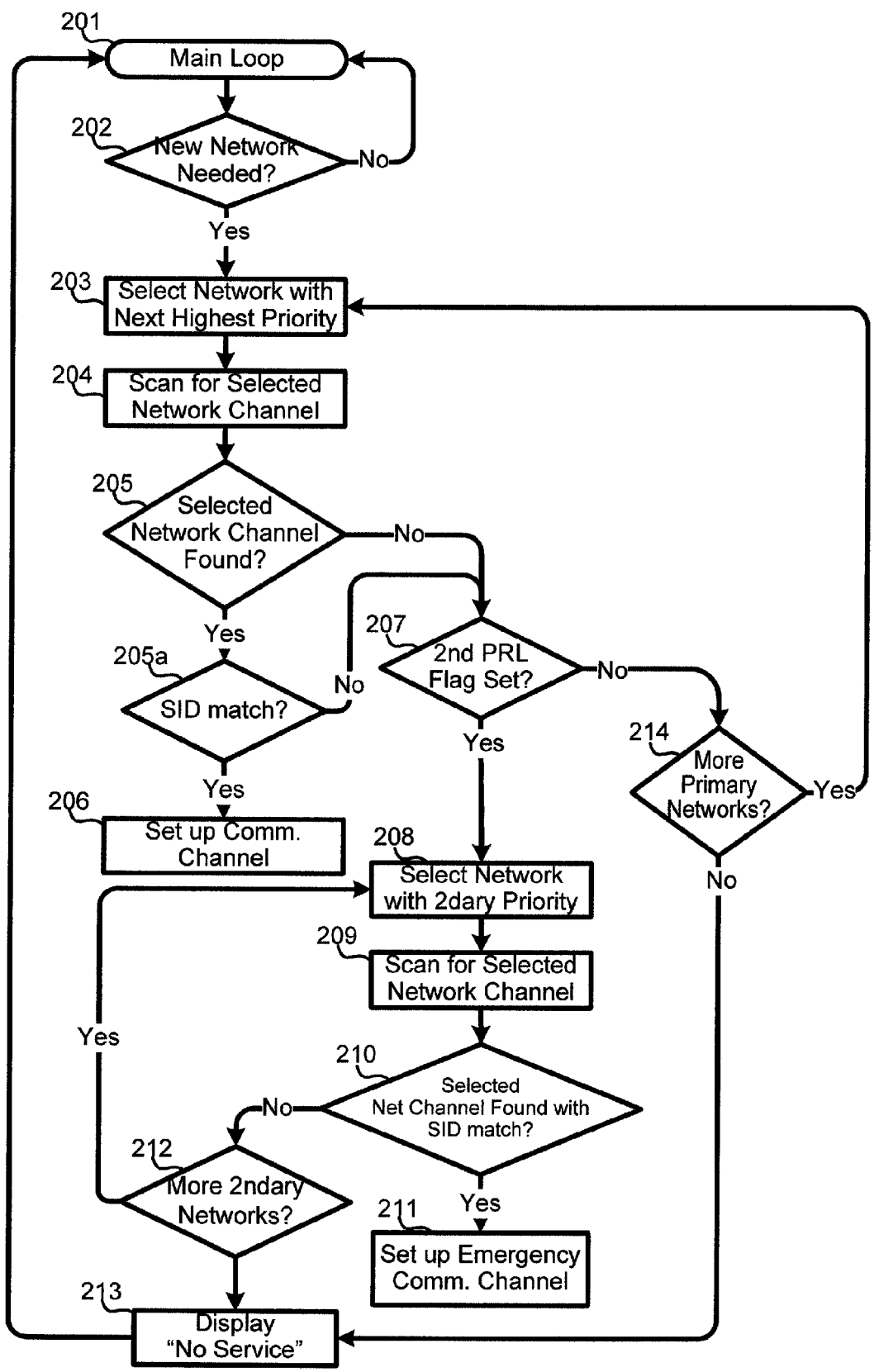
FIG. 4 is a process flow diagram of an embodiment method suitable for implementation on a mobile device.

FIG. 4 illustrates the process flow of an embodiment method that provides switch on wheels emergency call service access to civilian mobile devices. As the mobile device performs its main loop 201 routine a variety of circumstances may require the mobile device to attempt to acquire a new communication network. For example, as the mobile device travels it may move out of range of the network with which it is currently communicating. Thus, the mobile device routinely checks to determine if a new communication network is needed, step 202. If a base station is available with sufficient signal strength within the communication network to which the mobile device is currently connected then the mobile device does not need to find a new network (i.e., step 202="No") so the mobile device continues with main loop routine 201. If, however, the mobile device determines that a new communication network is needed (i.e., step 202="Yes"), the processor of the mobile device will access the SID and communication parameters for the highest priority communication network listed in the primary PRL system table 161, step 203. In instances where the mobile device seeks out a new communication network due to power up, the home system will be the highest priority network. The mobile device processor scans the listed frequency and channel for the selected network by using the acquisition index corresponding to the selected network and acquisition table 162, step 204. If the mobile device encounters a pilot signal on the scanned frequency, step 205, the system acquisition function receives an SID from the base station over the associated synchronization channel. The received SID is compared with the SID stored in the system table 161 to determine if the selected network channel is found, step 205a. If the received SID matches the expected SID listed in the system table 161 (i.e., step 205a="Yes"), then the mobile device sets up the communication channel with the communication network and allows the mobile device to conduct communication as normal, step 206. It is noted that the steps of checking for a pilot signal, step 205, and comparing the SID to the expected SID, step 205a, may be accomplished in a single step.

If the no pilot signal is obtained on the designated frequency (i.e., step 205="No") or if the received SID does not match the expected SID for the selected network in the system table 161 (i.e., step 205a="No"), then the mobile device processor will check the system table 161 to determine if the switch-to-secondary-PRL flag has been set, step 207. Referring to the exemplary system table 161 in FIG. 3, the switch-to-secondary-PRL flag is not encountered as set until the mobile device processor has attempted to connect with Roaming Partner 3. If the switch-to-secondary-PRL flag has not been set (i.e., step 207="No"), then the mobile device processor will determine if any more networks appear in the primary PRL system table 161, step 214. Referring back to the system table 161 of FIG. 3, three additional networks may be selected. Thus, as long as additional communication networks are listed in the primary PRL system table 161 (i.e., step 214="Yes"), the mobile device will continue to scan for available networks in the primary PRL to connect through by returning to select the next highest priority network from the primary PRL, step 203. If no additional networks are available (i.e., step 214="No"), then the mobile device will have exhausted all available networks without being able to connect with any. Accordingly, the mobile device will indicate that "No Service" is available, step 213, after which processing may return to the main loop 201.

If, however, the mobile device scans each of the available networks in the primary PRL and discovers a record in which the switch-to-secondary-PRL flag is set (i.e., step 207="Yes"), the mobile device processor will initiate the emergency call sub-routine and select the highest priority networks listed in the secondary PRL system table 163, step 208. For example, referring to the primary and secondary PRLs shown in FIG. 3, if the mobile device scans for Roaming Partner 3, but still is unable to find or connect with any of the listed networks in the primary PRL system table 161, the switch-to-secondary-PRL flag set in the Roaming Partner 3 data record of the primary PRL system table 161 will cause the mobile device processor to refer to the secondary PRL's system table 163. Similar to the primary PRL system table 161, the secondary PRL system table 163 is a prioritized list of emergency networks that the mobile device is permitted to access. Referring to the exemplary secondary PRL system table 163, the SID of the switch on wheels is listed. While the exemplary secondary PRL system table 163 shown in FIG. 3 only lists a single emergency network, as with the primary PRL system table 161, multiple emergency networks may be listed in the secondary PRL system table.

Using the communication parameters listed for the highest priority network in the secondary PRL system table 163 the mobile device scans the corresponding frequency or channel, step 209. For example, FIG. 3 shows that the emergency switch on wheels network listed in the secondary PRL system table 163 communicates on the PCS CDMA Block B channels. The mobile device determines whether a pilot signal is present on the scanned frequency compares any received SID to the SID stored in the secondary PRL system table 163 to determine if the selected network channel is found, step 210. If a pilot signal is encountered and the received SID matches the expected SID listed in the secondary PRL system table 163 (i.e., step 210="Yes"), then the mobile device sets up an emergency communication channel with the selected emergency communication network and configures the mobile device to complete only emergency calls (e.g., 911-type calls), step 211. In setting up the emergency communication capability, the mobile device will be programmed to allow the user to place calls that are dialed to a recognized an emergency call service, such as 911. Calls to other numbers (i.e., other than 911, for example) will not be executed (i.e., there will be no attempt to place the call through the connected network).

In alternative embodiments, the emergency communication channel may be configured to also allow the user to receive calls over the switch on wheels from emergency services only. In this manner emergency services may contact the user to obtain additional information regarding the emergency that is being reported. This capability will maximize the limited resources associated with the radio access network as well as the backhaul to the PSAP during time of crisis. Such capability can be implemented at the switch on wheels which can be configured to route calls to civilian mobile devices only if they originate at a recognized and authorized first responder. The mobile device may be configured to receive any calls directed to it from the connected communication network.

If no pilot signal was encountered on the selected frequency or channel or if the received SID does not match the expected SID for the selected emergency network in the secondary PRL system table 163 (i.e., step 210="No"), the mobile device processor will check the secondary PRL system table 163 to determine if any more emergency networks appear in the secondary PRL system table 163, step 212. If no additional emergency networks are available (i.e., step 212="No"), then the mobile device will have exhausted all available emergency networks without being able to connect with any, so the mobile device will indicate that "No Service" is available, step 213. Having found no available communication networks, emergency or otherwise, the mobile device returns to the main loop 201 until the next search for a new network is initiated.

Figure 5:
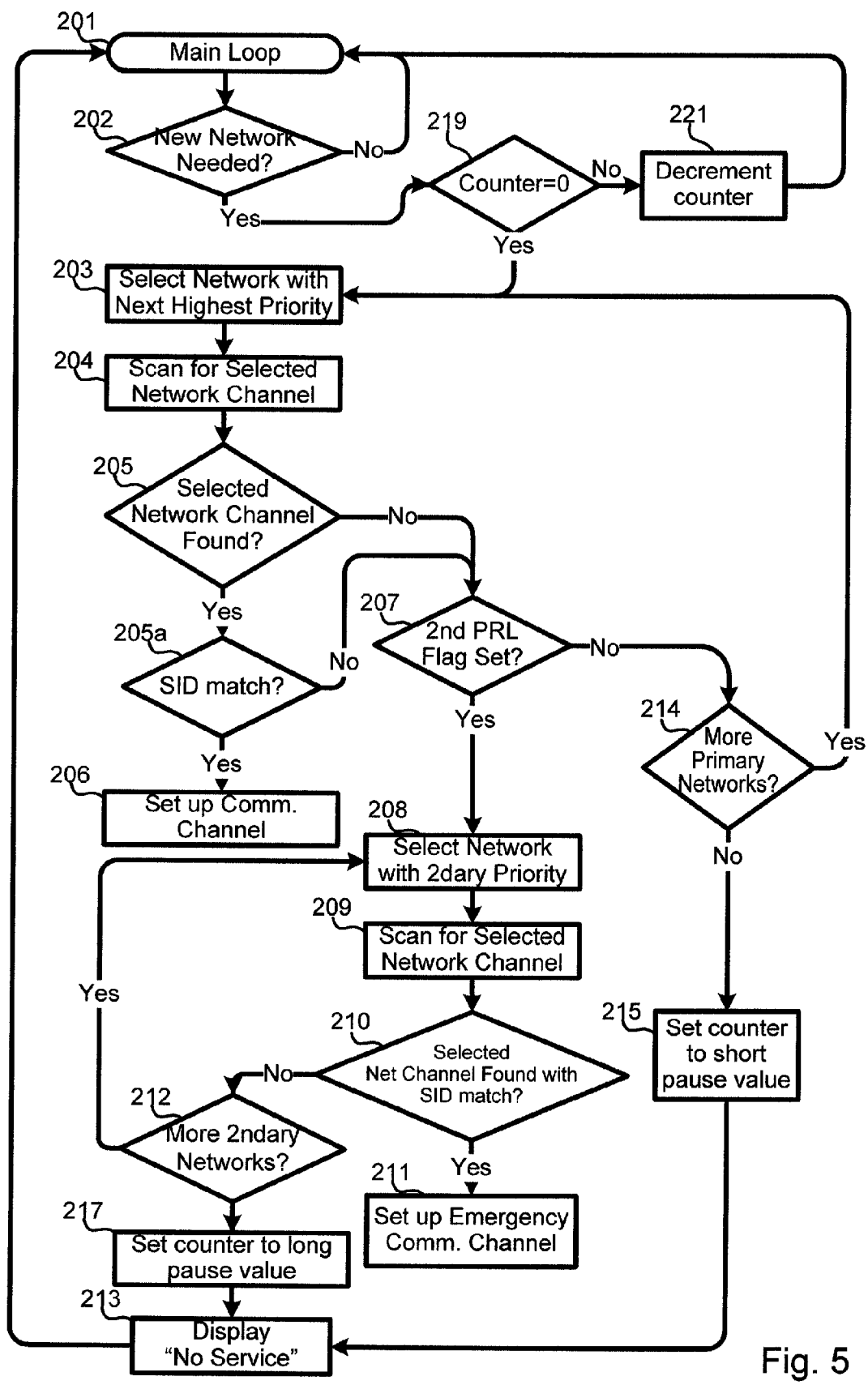
FIG. 5 is a process flow diagram of an alternative embodiment method suitable for implementation on a mobile device.

In an alternative embodiment, optional steps illustrated in FIG. 5 may be included to place the mobile device in a standby mode for a pre-determined period of time after determining that no service is available, step 214. Once the pre-determined period of time has elapsed, the mobile device may initiate another search for a new network by returning to step 203. In this manner, the mobile device may conserve additional battery resources by preventing the mobile device from continually searching for networks when it determines that no service is available. This embodiment helps to ensure that mobile device batteries are not rapidly depleted searching in vain for network services in disaster situations in which communications infrastructure is destroyed or rendered inoperable. Often the same event that knocks out cellular communication infrastructure will affect the electrical power infrastructure as well. By restricting the frequency of network searches, mobile device battery stores can be preserved until communication infrastructure is restored or a switch on wheels is put in place. Thus, this embodiment ensures that civilian mobile devices remain available when emergency communication networks are activated even when electrical utilities are not available.

Referring to FIG. 5, the embodiment method may proceed as described above with reference to FIG. 4 with the addition of a few steps. For example, before initiating a search for a new network, the processor may check a count down timer included to provide the time delay described above, step 219. If the counter equals zero (i.e., step 219="Yes"), the process of searching for a new network described above with reference to FIG. 4 will proceed through like numbered steps. If the counter does not equal zero (i.e., step 219="Yes"), this indicates that a delay is implemented, so the counter may be decremented, step 221, before the process returns to the main loop 201.

The amount of delay between searches for new networks can be controlled by adjusting the setting of the counter tested in step 219. For example, if the process determines that no service is available without checking the secondary PRL (i.e., step 214="No"), the counter may be set to a short pause value, step 215, as may be appropriate when the mobile device has not been programmed with a secondary PRL. In such situations, which may reflect the ordinary course, the mobile device may be temporarily in a location of no service, such as in a building, with no emergency situation occurring so a short delay before the next network search is appropriate. However, if the process determines that no service is available after checking all networks listed in the secondary PRL (i.e., step 212="No"), the counter may be set to a long pause value, step 217. In such situations, which may reflect an emergency situation, the mobile device has been programmed to search for emergency networks, and presume that there may be a significant delay before a network becomes available making it appropriate to implement a longer delay.

In another alternative embodiment, the secondary PRL acquisition table 163 may be omitted. Because the frequency at which the emergency networks operate may be the same as other non-emergency networks, an alternative embodiment may employ a single acquisition table. In the alternative embodiment, the secondary PRL may comprise a secondary PRL system table 162 which includes an acquisition index that refers to the various network frequencies and channels listed in the primary PRL acquisition table 162.

In some situations the disaster event may be predictable. For example, meteorologists can accurately predict major weather events such as tornados, hurricanes or other major storm systems that may destroy or render inoperable communications infrastructure. In order to pro-actively respond to such situations, emergency services may preemptively deploy equipment near the area expected to be affected. Cellular network service providers can then send out an OTA update to the PRL adding in the secondary PRL and setting the appropriate flags in the primary PRL. Alternatively, civilian mobile devices may be provisioned with a primary and secondary PRL but without the switch-to-secondary-PRL flag s set. In this implementation, the OTA update to the PRL may simply set the switch-to-secondary-PRL flag s allowing the OTA update to be short. For example, referring to FIG. 3, in order to initiate the scan for the switch on wheels emergency communication network, the mobile device must first scan four non-emergency communication networks. In practice, a mobile device's PRL may contain hundreds of authorized networks listed in the system table 161. If a major disruptive event is predicted for a particular area or geo, emergency service officials may ask cellular service providers to update the provisioning of all mobile devices in the geographic region so that the switch-to-secondary-PRL flag is set either immediately or after a small number of commercial networks are scanned in the particular area or geo. By proactively updating the provisioning of civilian mobile devices, access to the emergency call service may be more efficiently enabled. Once the disaster situation has been alleviated, a new provisioning update may transmitted OTA to return the switch-to-secondary-PRL flag settings to their values in the primary PRL system table 161. Even in unpredictable disasters, such as terrorist attacks and earthquakes, PRL updates may be sent out OTA to all mobile devices with service and within a particular radius of the affected area. In this manner, civilian mobile devices which may travel into the affected area will have emergency 911 service available. Also, mobile devices may be provisioned outside the area and then distributed to civilians within the affected area to give them emergency 911 service until normal cellular service is restored.

In addition to limiting civilian access to emergency 911 services, the switch on wheels may also limit access to network resources based on a tiered priority access system. In such systems the switch on wheels may include a database of known mobile device EINs, MINs and SIDs which identify mobile devices in a hierarchy based upon the roles and responsibilities of the owner and grant access to network resources based on their relative position in the hierarchy. A more complete description of an example tiered priority access system is provided in U.S. patent application Ser. No. 12/273,146, filed Nov. 18, 2008, which claims the benefit of priority to U.S. Provisional Application No. 60/990,938 filed Nov. 29, 2007, the entire contents of which are hereby incorporated by reference in their entirety.

After access to the communication channels on the switch on wheels is granted to the local citizenry for emergency service calls, the switch on wheels must route the emergency calls to the appropriate PSAP where emergency services can be dispatched. To route the 911 calls to the nearest appropriate PSAP, the system must first determine the approximate location from which the call is initiated. Since calls entering the system will be initiated from wireless mobile devices, the location of the mobile device must first be ascertained.

In an embodiment, the switch on wheels may utilize geodetic information provided by both the network and mobile devices to determine the location of the caller (and thus the PSAP to which the call should be routed). In a first embodiment, mobile devices equipped with GPS receivers can report their location to the switch on wheels in the manner provided for in conventional cellular telephone networks. In a second embodiment, the location of the switch on wheels may be utilized as an approximation of the geographic coordinates of the caller.

Using the geographic coordinate information provided by the mobile device's GPS receiver, a server located at the ground station connected to the switch on wheels via satellite link may determine the appropriate PSAP to receive the incoming call using a database of PSAP coverage areas. By maintaining a current database of PSAP geographic assignments, the ground station can route the call to the proper PSAP as some PSAPs are shutdown, realigned or otherwise adjusted to deal with the emergency situation. Using the PSAP information from the database, the receiving ground station can route the emergency call to the PSAP handling the region using the PSTN or whatever communication link is established with the PSAP. It is noted that in some emergencies, the PSAP assigned to handle the call may be geographically remote, such as in a regional, state or national emergency control center. Since the call is transmitted from the switch on wheels is a VoIP communication, the call can be routed to the selected PSAP over the Internet using VoIP protocols and equipment.

Figure 6:
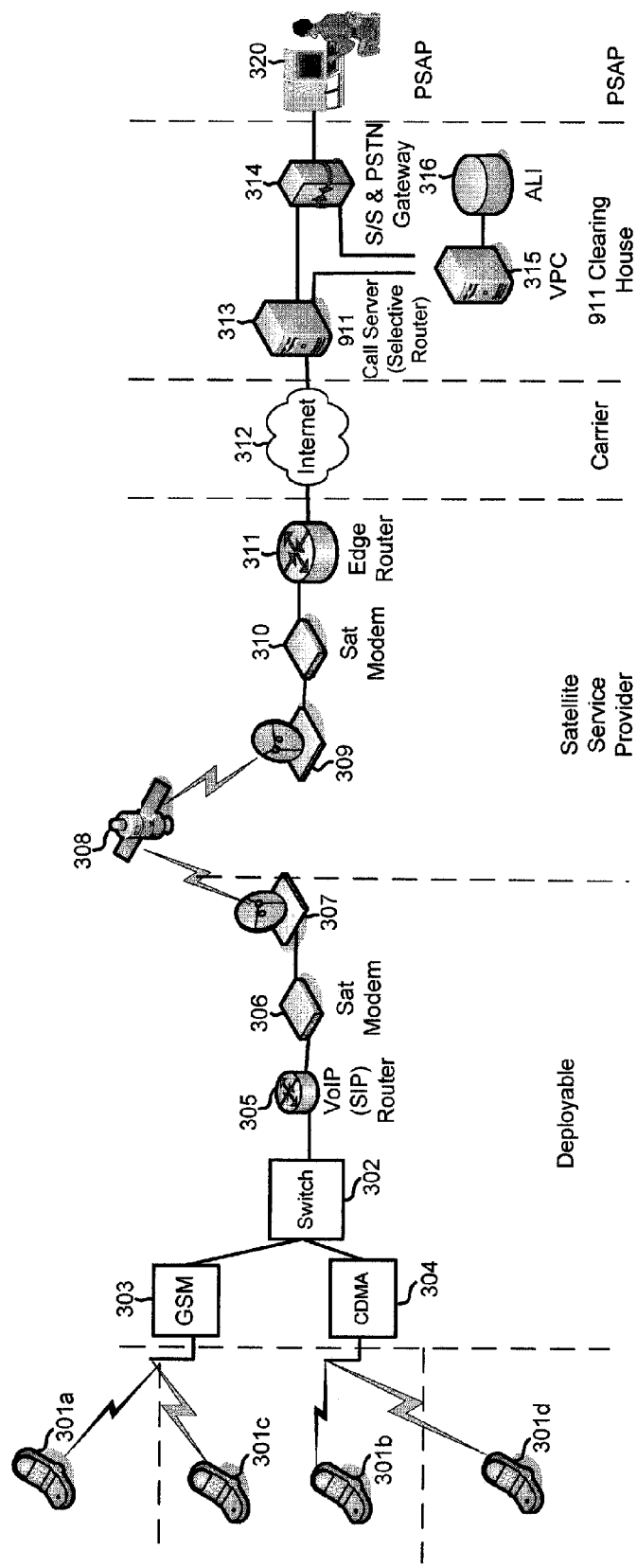
FIG. 6 is an emergency call system operating on a deployable wireless base station.

FIG. 6 illustrates the emergency call system operating on a deployable switch on wheels. As shown in the FIG. 5, a plurality of conventional mobile devices 301a-301d are within communication range of the deployable switch on wheels 302. Mobile device 301a is a GSM mobile device distributed to an authorized first responder/emergency personnel. Mobile device 301b is a CMDA-type mobile device distributed to an authorized first responder/emergency personnel. Mobile device 301c is a GSM type mobile device owned by a civilian. Mobile device 301d is a CDMA-type mobile device owned by a civilian.

As first responders/emergency personnel members, mobile devices 301a and 301b are provisioned with the SID of the switch on wheels network 302, so the SID will appear in the primary PRL system table 161 of these authorized mobile devices. In this embodiment, both mobile devices 301a and 301b will be able to send and receive voice and data signals to and from the switch on wheels network. Consequently, if an emergency situation develops and the switch on wheels is deployed, mobile devices 301a and 301b will be able to interoperate with the switch on wheels 302 in a roaming mode. In this manner, the first responder/emergency personnel who own and operate mobile devices 201a and 301b will be provided with full communication capabilities in an emergency situation where a switch on wheels 302 has been deployed.

In contrast, mobile devices 301c and 301d are owned by civilians and so will not have the SID of the switch on wheels included in their provisioning data. While it is desirable to provide the local civilians with emergency (e.g. 911) calling capability, it would be undesirable to provide them with unfettered access to the limited communication resources of a switch on wheels 302 network. In emergency situations it is critical to reserve limited communication resources to essential emergency response communication so that the emergency situation can be properly managed. Thus, not including the switch on wheels SID in civilian mobile device 301c and 301d provisioning helps to reserve emergency communications resources for designated first responders. Mobile device 301c is a GSM-type mobile device. As such, mobile device 301c will be permitted to initiate an emergency call via the switch on wheels 302 network as part of standard GSM protocols. Because mobile device 301c does not contain the necessary SID programmed into its primary PLMN stored in memory, mobile device 301c will not be able to receive any voice or data signal from the switch on wheels 302 network. In addition, for the same reason, mobile device 301c will not be able to initiate any call other than an emergency call through the switch on wheels 302 network.

Mobile device 301d is a civilian CDMA-type mobile device, and as such will be permitted to initiate an emergency call via the switch on wheels 302 network only if the SID of the switch on wheels 202 network is programmed in the secondary PRL system table 163 in its memory. The switch on wheels 302 network SID may be programmed into the secondary PRL system table 163 of mobile device 301d by the wireless service provider when the phone was initially activated or subsequently through a hard update or an OTA provisioning. Because the switch on wheels 302 network SID is stored in the secondary PRL system table 163, the mobile device 301d will only access the network in the emergency access mode, and therefore will not be able to receive any voice or data signal from the switch on wheels 302 network. In addition, for the same reason, mobile device 301d will not be able to initiate any call other than an emergency call through the switch on wheels 302 network.

As shown in FIG. 6, mobile devices 301a-301d with the SID of the switch on wheels 302 network stored in either a primary PRL system table 161 or secondary PRL system table 163 receive a control signal from the deployable switch on wheels 302. A GSM 303 and CDMA 304 call router located within the deployable switch on wheels 302 communicates with the plurality of mobile devices 301. The communication signals received from the GSM 303 and CDMA 304 call routers are sent to a VoIP Router 305 located within the deployable switch on wheels 302 to convert the communication signals into IP packets capable of being transmitted over the Internet. As part of the communication signals received by the deployable switch on wheels 302, location coordinates derived from either handset provided geodetic information or the location of the switch on wheels, as well as mobile device phone number data, are transmitted with the communication signal.

The signals from the VoIP router 305 are sent to a satellite system router 306, such as an iDirect unit, as IP packets. The satellite routed IP packets are relayed to the satellite uplink 307 where the IP packets are transmitted to a geosynchronous communication satellite 308. The IP packets are relayed by the satellite 308 to a satellite downlink 309 such as maintained by a satellite service provider. The received IP packets are received by the satellite router 310 located in the satellite service provider facility and routed to an Edge Router 311. The Edge Router 311 uses the location information associated with the call to determine the PSAP assigned to the callers location, and then routes the 911 call as it would any VoIP call over the Internet 312 or via the PSTN to the selected PSAP. In an alternative embodiment, the call or information from the call may first be routed to a call server 313 which is associated with a 911 clearing house facility that maintains the database of PSAP assignments for the emergency region so the call server 313 can select the appropriate PSAP 320. The call may be routed with the use of a selective server using the process currently used for a VoIP call where the VoIP call is terminated at the S/S and PSTN Gateway 316 enabling an interface to the PSAP 320 via traditional telephony circuits. The VOC and ALI information will also be passed to the appropriate PSAP 320 as part of the call delivery method enabling the call to be routed to the appropriate PSAP 320 and call handler at the PSAP. Therefore, once the appropriate PSAP 320 is determined, the call initiated by one of the plurality of mobile devices is connected to the selected PSAP 320. In addition to voice data, the PSAP 320 can receive location coordinates identifying the location of the mobile device 301 as well as the phone number of the mobile device 301. In this manner, the PSAP 320 is provided with the approximate location of the emergency situation being reported as well as the call back number in the event the call is dropped or interrupted.

In embodiments where the programming of the mobile device allows for the receipt of calls from authorized emergency services over the switch on wheels in an emergency mode, the system can enable a call back to take place since the call from the switch on wheels to the PSAP is a VoIP call and the calling number has an ALI associated with it enabling the PSAP operator to place a call to the citizens handset that dialed 911. The reverse 911 call involves the deploy able switch on wheels keeping the citizens mobile number in the Visitor Location Register (VLR) and mapping the Temporary Line Directory Number (TLDN) associated with the 911 callers MIN to the VoIP number used as the prefix for the VoIP call delivery to the PSAP.

Figure 7:
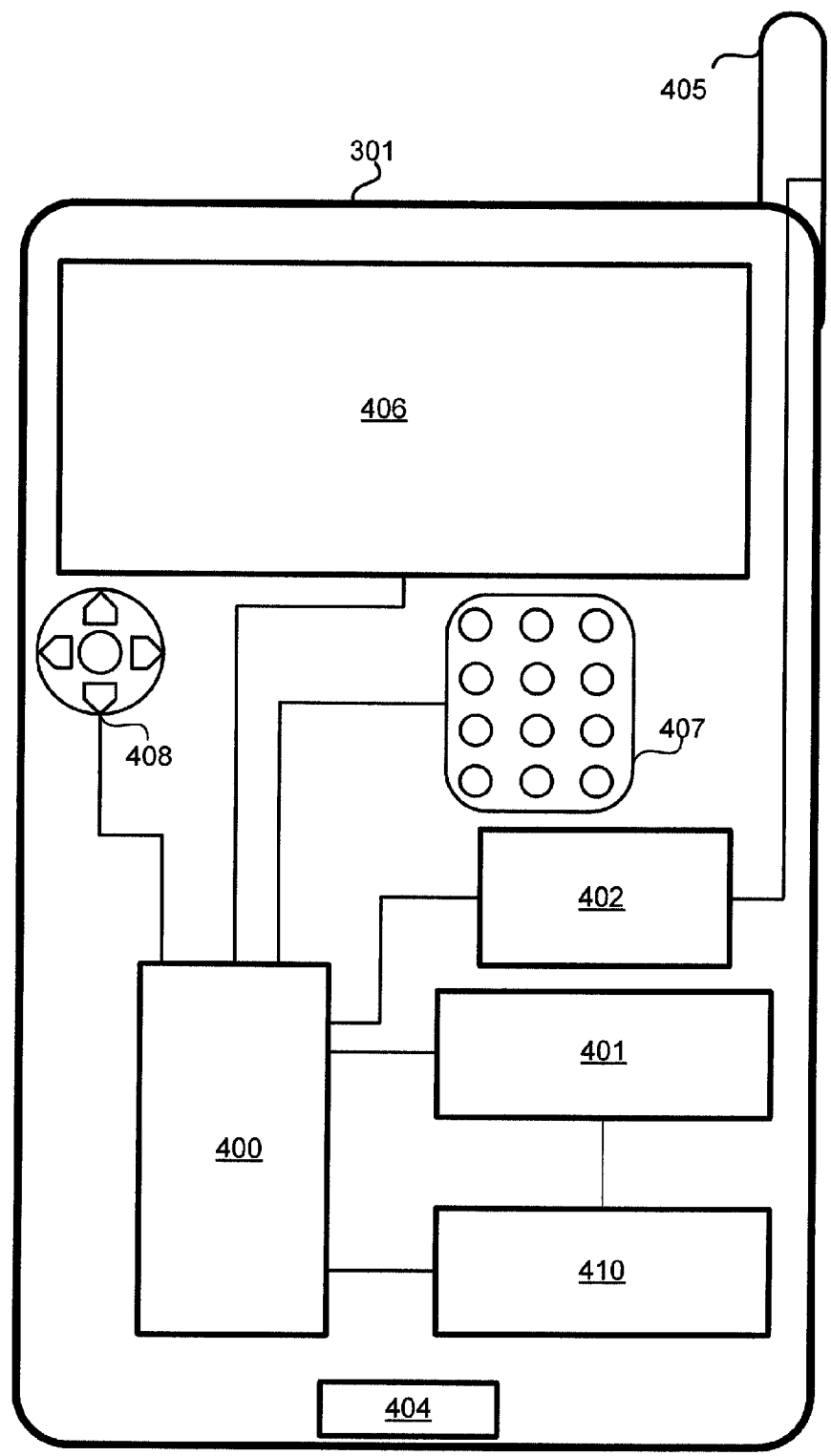
FIG. 7 is a component block diagram of an example cellular telephone network gateway suitable for use in the various embodiments.

Referring to FIG. 7, a mobile device 301 will typically include a processor 400 coupled to a random access memory 401 and a wireless transceiver 402 coupled to an antenna 403 for sending and receiving voice and data calls via a cellular network. Typical mobile devices also include a rechargeable battery 404 which provides power to the processor 400 and transceiver 402, allowing the unit to be portable. The mobile device 301 may also include components typically employed in commercial cell phones, including a display 406, a keyboard 407, a pointing device 408 and a parallel or serial bus connector 409, all coupled to the processor 400. The mobile devices 301 may also include a mass storage device 410 coupled to the processor and random access memory 401, which may contain large amounts of data. The mass storage device 410 or random access memory may contain the provisioning/programming information for mobile device 201 operation. The provisioning/programming information may include PRLs and positive and negative SID lists as described herein.

Another embodiment utilizes the additional communication channels maintained by the deployable switch on wheels 302 to transmit emergency notifications to all conventional mobile devices in the broadcast area. While the deployable switch on wheels 302 may only receive emergency calls from mobile device operated by the local civilians, the additional communication channels maintained by the deployable switch on wheels 302 may be utilized to transmit emergency information messages to the general population. These emergency notifications may be in the form of broadcast voice messages or SMS text messages pushed out to all mobile devices in the broadcast range. Through the use of the secondary PRL system table 163 the mobile device may camp on the control channel of the switch on wheels emergency network. The mobile device may also receive SMS or Cellbroadcast messages regardless of whether the device is GSM or CDMA because the handset will now recognize the deployable SID as being an authorized emergency network and can now read the control channel.

The hardware used to implement the forgoing embodiments may be processing elements and memory elements configured to execute a set of instructions, wherein the set of instructions are for performing method steps corresponding to the above methods. Alternatively, some steps or methods may be performed by circuitry that is specific to a given function.

Those of ordinary skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, firmware, or software depends upon the particular application and design constraints imposed on the overall system. Those of ordinary skill in the art may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile device are intended to encompass any one or all memory modules within the mobile device without limitation to a particular configuration, type, or packaging. An exemplary storage medium is coupled to a processor in the mobile device such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

I claim:

1. A method for providing emergency call service access to a deployable wireless network resource, comprising:
provisioning a mobile device with a primary preferred roaming list (PRL) and a secondary PRL, wherein the primary PRL lists communication networks to which the mobile device is permitted full access and wherein the secondary PRL lists communication networks to which the mobile device is permitted limited emergency call access;
detecting a switch-to-secondary-PRL flag included within the primary PRL while attempting to access communication networks listed in the primary PRL;
switch-to-secondary-PRL flag selecting an emergency communication network from the secondary PRL upon detection of the switch-to-secondary-PRL flag;
scanning a frequency listed in the secondary PRL for the selected emergency communication network;
receiving a system identification number (SID) on the scanned frequency;
comparing the received SID to an SID of the selected emergency communication network listed in the secondary PRL; and
allowing emergency call initiation on the mobile device if the received SID matches the SID of the selected emergency communication network.

2. The method of claim 1, further comprising updating switch-to-secondary-PRL flag the primary and secondary PRL to set the switch-to-secondary-PRL flag.

3. The method of claim 2, wherein the primary and secondary PRL are updated over the air in advance of a predicted weather event to mobile devices in a region predicted to be affected by the weather event.

4. The method of claim 1, further comprising allowing the mobile device to receive calls from emergency service personnel if the received SID matches the SID of the selected emergency communication network.

5. The method of claim 1, further comprising allowing the mobile device to receive SMS from emergency service personnel if the received SID matches the SID of the selected emergency communication network.

6. The method of claim 1, further comprising placing the mobile device in a standby mode for a predetermined period of time if the received SID does not match the SID of the selected emergency communication network.

7. A mobile device, comprising:
a processor;
a wireless transceiver coupled to the processor; and
a memory coupled to the processor,
wherein the memory has stored therein provisioning information including a primary preferred roaming list (PRL) and a secondary PRL, the primary PRL listing communication networks to which the mobile device is permitted full access and the secondary PRL listing communication networks to which the mobile device is permitted limited emergency call access, and
wherein the processor is configured with executable software instructions to perform steps comprising:
detecting a switch-to-secondary-PRL flag included within the primary PRL while attempting to access communication networks listed in the primary PRL;
selecting an emergency communication network from the secondary PRL upon detection of the switch-to-secondary-PRL flag;
attempting to access the selected emergency communication network using a frequency listed in the secondary PRL;
receiving a system identification number (SID) on the frequency listed in the secondary PRL;
comparing the received SID to an SID of the selected emergency communication network listed in the secondary PRL; and
allowing emergency call initiation on the mobile device if the received SID matches the SID of the selected emergency communication network.

8. The mobile device according to claim 7, wherein the processor is configured with executable software instructions to perform further steps comprising receiving an update to the primary and secondary PRL.

9. The mobile device according to claim 7, wherein the processor is configured with executable software instructions to perform further steps comprising receiving an update to the primary PRL which sets a switch-to-secondary-PRL flag stored within at least one record within the primary PRL.

10. The mobile device according to claim 7, wherein the processor is configured with executable software instructions to perform further steps comprising completing a call to the selected emergency communication network only if a dialed number is for a recognized emergency service.

11. The mobile device according to claim 10, wherein number for a recognized emergency service is 911.

12. The mobile device according to claim 7, wherein the processor is configured with executable software instructions to perform further steps comprising monitoring the selected emergency communication network for simple message service (SMS) messages.

13. The mobile device according to claim 10, further comprising a global positioning system (GPS) receiver coupled to the processors, wherein the processor is configured with executable software instructions to perform further steps comprising:
determining location coordinates of the mobile device using the GPS receiver; and
including the location coordinates in communications with the selected emergency communication network when completing the call to the recognized emergency service.

14. The mobile device according to claim 7, wherein the processor is configured with executable software instructions to perform further steps comprising selecting another emergency communication network from the secondary PRL if no pilot signal is received in the attempt to access the selected emergency communication network using a frequency listed in the secondary PRL or the received SID does not match the SID of the selected emergency communication network.

15. The mobile device according to claim 14, wherein the processor is configured with executable software instructions to perform further steps comprising pausing for a predetermined period of time before searching for a new communication network if communication could not be establish with any emergency communication network listed in the secondary PRL.

16. A tangible storage medium having stored therein processor-executable software instructions configured to cause a mobile device processor to perform steps comprising:
detecting a switch-to-secondary-PRL flag included within a primary preferred roaming list (PRL) while attempting to access communication networks listed in the primary PRL;
selecting an emergency communication network from a secondary PRL upon detection of the switch-to-secondary-PRL flag;

attempting to access the selected emergency communication network using a frequency listed in the secondary PRL;

receiving a system identification number (SID) on the frequency listed in the secondary PRL;

comparing the received SID to an SID of the selected emergency communication network listed in the secondary PRL; and allowing emergency call initiation on the mobile device if the received SID matches the SID of the selected emergency communication network.

17. The tangible storage medium of claim 16, wherein the therein processor-executable software instructions stored therein are configured to cause a mobile device processor to perform further steps comprising receiving an update to the primary and secondary PRL.

18. The tangible storage medium of claim 16, wherein the therein processor-executable software instructions stored therein are configured to cause a mobile device processor to perform further steps comprising receiving an update to the primary PRL which sets a switch-to-secondary-PRL flag stored within at least one record within the primary PRL.

19. The tangible storage medium of claim 16, wherein the therein processor-executable software instructions stored therein are configured to cause a mobile device processor to perform further steps comprising completing a call to the selected emergency communication network only if a dialed number is for a recognized emergency service.

20. The tangible storage medium of claim 16, wherein the therein processor-executable software instructions stored therein are configured to cause a mobile device processor to perform further steps comprising monitoring the selected emergency communication network for simple message service (SMS) messages.

21. The tangible storage medium of claim 16, wherein the therein processor-executable software instructions stored therein are configured to cause a mobile device processor to perform further steps comprising:

determining location coordinates of the mobile device using a GPS receiver; and including the location coordinates in communications with the selected emergency communication network when completing the call to the recognized emergency service.

22. The tangible storage medium of claim 16, wherein the processor-executable software instructions stored therein are configured to cause a mobile device processor to perform further steps comprising selecting another emergency communication network from the secondary PRL if no pilot signal is received in the attempt to access the selected emergency communication network using a frequency listed in the secondary PRL or the received SID does not match the SID of the selected emergency communication network.

23. The tangible storage medium of claim 16, wherein the processor-executable software instructions stored therein are configured to cause a mobile device processor to perform further steps comprising pausing for a predetermined period of time before searching for a new communication network if communication could not be establish with any emergency communication network listed in the secondary PRL.

* * * * *